Sept. 19, 1950
R. V. ANDERSON
2,522,659
CLAMPING DEVICE
Filed April 5, 1946
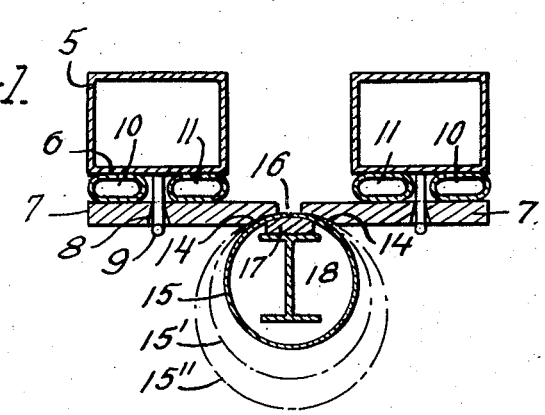
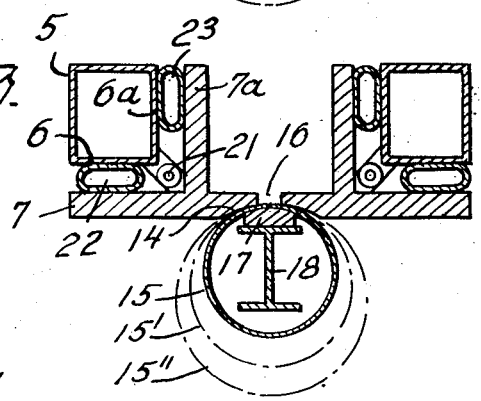
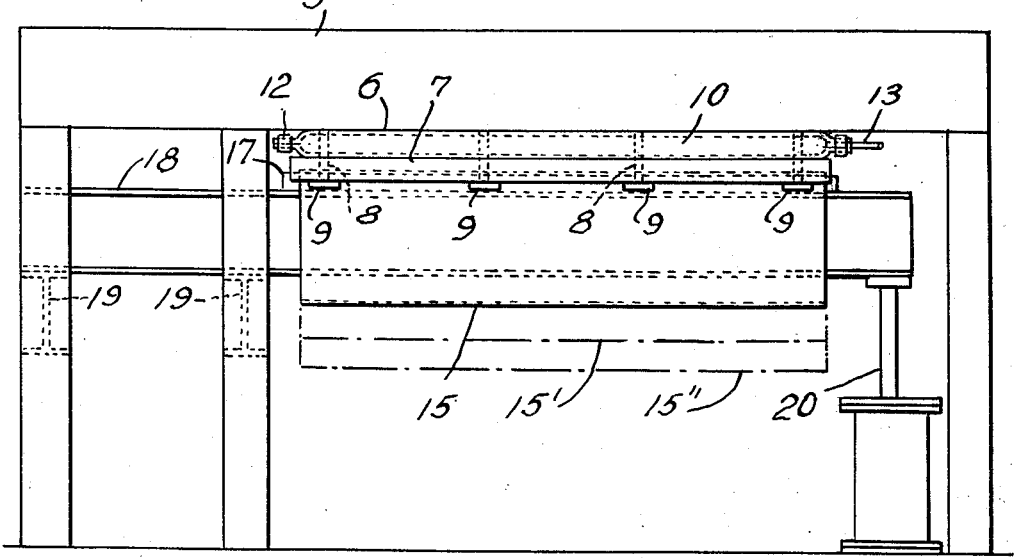
INVENTOR
REA V. ANDERSON.
BY
Pennie, Edmonds, Morton and Barrows
ATTORNEYS Patented Sept. 19, 1950

2,522,659

UNITED STATES PATENT OFFICE 2,522,659

CLAMPING DEVICE

Rea V. Anderson, Los Angeles, Calif., assignor to Rheem Manufacturing Company, Richmond, Calif., a company of California Application April 5, 1946, Serial No. 659,749

3 Claims. (Cl. 113—102)

1

This invention relates to welding equipment and, more particularly, to clamping devices for holding a metal part in position for welding, and has for its object the provision of an improved clamping device of this character.

In the mass production of welded metal parts it is essential that the work be held in position by a clamping device capable not only of holding the work securely in place during welding but further capable of being easily released to remove the finished work and to then receive the next work to be welded. This is particularly true of large parts such as cylindrical shells in which longitudinal seams are to be welded. In welding such longitudinal seams, the pressure of the clamping device must be sufficient to hold the abutting edges of the shell in alignment by holding them firmly against a backing bar or mandrel which supports the shell adjacent the seam. The pressure must also be adequate, in the case of arc welding, to insure good electrical contact between the shell and the conducting backing-bar.

A clamping device for welding such longitudinal seams is described in the patent to D. P. Bisbee, No. 2,371,376. The device shown therein is satisfactory for holding a shell while its seam is welded with bare welding rod. However, the single expansible element which provides the clamping pressure in this device does not provide the flexibility of operation required in submerged melt welding.

The present invention contemplates an improved clamping device particularly adapted for holding a cylindrical body or shell during welding of its longitudinal seam by a submerged melt weld. It comprises a frame, a clamping arm adapted at one end to engage the metal part to be held in welding position, and hinge means secured to the frame adapted to support the clamping arm in hinged relationship to the frame. Two expansible means are provided which are so disposed between the clamping arm and the supporting frame as to move the clamping arm about the hinge upon expansion of one of the expansible means and contraction of the other. Means are provided for delivering a fluid under controlled pressure to each of the expansible means so as to control movement of the clamping arm about the hinge. A pair of such clamping devices is used advantageously to hold the two edges of a longitudinal seam firmly against supporting means such as a backing-bar or mandrel.

The foregoing and other novel features of the invention will be more fully understood from the following description taken in conjunction with the accompanying drawing, in which:

Fig. 1 is a side elevation in section of a pair of clamping devices of the invention holding a cylindrical shell in place for welding;

Fig. 2 is a front elevation of the clamping device shown in Fig. 1; and

Fig. 3 is a side elevation in section of another modification of the clamping device of the invention.

The clamping device shown in Figs. 1 and 2 comprises a supporting frame 5 having a substantially flat lower surface 6. The frame shown in the drawing is constructed of two angle irons welded together to form a hollow rectangular beam, although other constructions may be used. The frame, appropriately supported at each end, is advantageously at least as long as the work to be clamped in welding position. A clamping arm 7, preferably extending the full length of the work to be held, is supported from the frame by suitable hinge means. In the clamping device shown in Figs. 1 and 2, the hinge means comprises a plurality of tapered openings 8 in the clamping arm through each of which extends a T-headed screw 9 secured to the bottom of the frame 5. The T-head of each screw supports the clamping arm 7, and the tapered opening 8 in the clamping arm through which each screw passes permits tilting of the arm as if on a hinge.

Movement or tilting of the clamping arm 7 about its hinge is provided by two separate sections 10 and 11 of fire hose, or the like, running longitudinally between the lower frame surface 6 and the clamping bar 7 along each side of the screws 9. Each hose section is sealed at one end 12 and is connected at its other end 13 with an independent supply of compressed air or other suitable gaseous or liquid fluid under controlled pressure.

As seen in the drawing, a pair of these clamping devices is provided with the clamping end of each arm 7 arcuate, as shown at 14, so as to engage opposite sides of the shell 15 adjacent the longitudinal seam 16 to be welded. The arcuate surface 14 is advantageously such as to correspond to the curvature of the largest diameter shell to be welded, indicated in the drawing by the dotted-line shell structure 15″. The arcuate surface 14 will thus make a firm contact with a small diameter shell 15 or a shell 15′ of intermediate diameter. The shell 15 is supported by a conventional backing-bar 17 having an arcuate upper surface to correspond to the curvature of the smallest diameter shell 15 to be welded. The backing-bar is supported by any suitable means, such as the I-beam 18. One end of the supporting beam 18 is rigidly mounted, as shown at 19 in Fig. 2, and the other end is held in position by a movable supporting structure such as the hydraulic plunger 20.

In the operation of the clamping device, the arcuate clamping end 14 of each clamping arm is raised by filling the hose section 10 with compressed air, or the like, and allowing the hose section 11 to remain uninflated or slack. With the supporting plunger 20 lowered, the cylindrical shell 15 is moved into welding position on top of the backing-bar 17. The plunger 20 is then raised to prevent deflection of the backing-bar during welding. With the shell 15 thus rigidly supported, each hose section 11 is filled with compressed air and each hose section 10 is permitted to go slack so as to force the arcuate end 14 of each clamping arm down against the shell adjacent the longitudinal seam 16. The clamping force may be increased as desired by increasing the pressure of the air supplied to the hose sections 11. The two clamping devices are relatively so positioned that when the arms 7 are in clamping position the ends of the arms are separated by a distance sufficient to permit submerged melt welding of the longitudinal seam 16. In actual practice, I have found that a spacing of five-eighths of an inch is satisfactory for this purpose. When the welding is finished, each hose section 10 is filled with compressed air and each hose section 11 is permitted to go slack. The force exerted by the expanding hose sections 10 is sufficient to raise the end of each clamping arm 7 in spite of agglomerations of fused flux and slag produced in the welding zone between the ends of the arms.

The clamping device shown in Fig. 3 is a modified form of the invention in which the clamping arm 7 is provided with a branch arm 7a forming a subtended angle substantially equal to the angle established by the flat lower surface 6 and the adjacent flat side surface 6a of the frame 5. A hinge 21 is secured to the corner of the frame formed by its two surfaces 6 and 6a and is secured to the clamping arm 7 adjacent the vertex of the arm 7 and its branch 7a. Hose sections 22 and 23 are positioned between the lower surface 6 and the arm 7 and between the side surface 6a and the branch arm 7a, respectively. The clamping device functions in a manner similar to that of Fig. 1, expansion of the hose section 22 with the hose section 23 slack moving the arcuate end 14 of the clamping arm away from the work and expansion of the hose section 23 with the hose section 22 slack moving the arm into clamping position against the seam 16.

It will be seen, accordingly, that the improved clamping device of the invention provides the clamping pressure required along the longitudinal seam of a cylindrical body to be welded as well as the control necessary to remove the clamping arms from the welding zone of a submerged melt welding operation. By simultaneous control of the pressure in each of the expansible means of each clamping device, movement of the clamping arm can be sensitively controlled for rapid and effective positioning of the work to be welded. Although the clamping device has been described in conjunction with submerged melt welding of cylindrical shells, it is not limited to such use and is adapted to hold other shapes of metal parts for submerged melt or other types of welding techniques.

I claim:

1. A clamping device for holding a metal part in position for welding which comprises a supporting frame, a clamping arm member adapted at one end to engage the metal part to be held, hinge means secured to the frame and adapted to support the arm member in hinged relationship to the supporting frame at a position located between the ends of the arm, and hydraulic expansible means disposed between the clamping arm and the supporting frame on opposite sides of said hinge means.

2. A clamping device for holding a metal part in position for welding which comprises a supporting frame, a clamping arm member adapted at one end to engage the metal part to be held, hinge means secured to the frame and adapted to support the arm member at a position located between the ends of the arm in hinged relationship to the supporting frame, hydraulic expansible means disposed between the clamping arm and the supporting frames on opposite sides of said hinge means, and means for delivering a fluid under controlled pressure to each of said expansible means.

3. A clamping device for holding a metal part in position for welding which comprises a supporting frame having two adjacent surfaces angularly disposed with respect to one another, a clamping arm member adapted at one end to engage the metal part to be held and having a branched portion a substantial distance from said end, the branched portion subtending an angle substantially equal to the angle formed by the said two surfaces of the supporting frame, hinge means secured to the frame and adapted to support the clamping arm member adjacent the vertex of said branched portion with the branches in spaced relationship with the angularly disposed surfaces of the frame, and hydraulic expansible means disposed between each of said surfaces of the frame and the corresponding branches of said arm member.

REA V. ANDERSON.

REFERENCES CITED

The following references are of record in the file of this patent:

UNITED STATES PATENTS

| Number | Name | Date |
| --- | --- | --- |
| 1,231,357 | Herr | June 26, 1917 |
| 1,349,070 | Latshaw | Aug. 10, 1920 |
| 1,729,076 | Laycock | Sept. 24, 1929 |
| 1,732,217 | Breest | Oct. 22, 1929 |
| 1,922,249 | Koch | Aug. 15, 1933 |
| 2,124,735 | Flint | July 26, 1938 |
| 2,235,553 | Haversack | Mar. 18, 1941 |
| 2,256,879 | Cornell, Jr. | Sept. 23, 1941 |
| 2,260,611 | Di Santo | Oct. 28, 1941 |
| 2,371,376 | Bisbee | Mar. 13, 1945 |